United States Patent [19]

Wilson

[11] 4,224,924
[45] Sep. 30, 1980

[54] SOLAR COLLECTOR FOR FLUID HEATING SYSTEM

[76] Inventor: David C. Wilson, 617 Allen Dr., Riverdale, Ga. 30274

[21] Appl. No.: 878,565

[22] Filed: Feb. 17, 1978

[51] Int. Cl.³ .............................................. F24J 3/02
[52] U.S. Cl. ................................... 126/419; 126/418; 126/422
[58] Field of Search ............... 126/271, 418, 422, 448, 126/450

[56] References Cited

U.S. PATENT DOCUMENTS

| | | | |
|---|---|---|---|
| 2,202,756 | 12/1978 | Hopper | 126/450 |
| 3,039,453 | 12/1978 | Hopper | 126/450 |
| 3,299,881 | 12/1978 | Hopper | 126/450 |
| 3,985,117 | 12/1978 | Hopper | 126/450 |
| 4,055,163 | 10/1977 | Costello et al. | 126/271 |
| 4,098,259 | 7/1978 | Barber, Jr. et al. | 126/450 |
| 4,108,159 | 8/1978 | Wendel | 126/271 |
| 4,126,122 | 11/1978 | Bross | 126/271 |
| 4,131,111 | 12/1978 | Hopper | 126/450 |
| 4,137,899 | 2/1979 | Weslow | 126/271 |

Primary Examiner—Samuel Scott
Assistant Examiner—Wesley S. Ratliff, Jr.
Attorney, Agent, or Firm—Newton, Hopkins & Ormsby

[57] ABSTRACT

A solar collector for use in either an upfeed forced hot water heating system or a downfeed system features a pair of serpentine coils arranged in opposing flow relationship within a shallow insulated collector housing having a sealed glass closure panel. The two serpentine coils lie in spaced parallel planes within the housing, and the two coils are offset laterally so that their individual longitudinal loops overlap laterally by approximately one-half the width of each loop. The flow of heated fluid in each serpentine coil is controlled independently of the other coil by a temperature-responsive modulating valve connected in each coil close to the outlet end thereof within the housing. Efficiency of operation and practicality and economy of construction are featured.

1 Claim, 4 Drawing Figures

SOLAR COLLECTOR FOR FLUID HEATING SYSTEM

BACKGROUND OF THE INVENTION

The rapidly increasing use of solar energy in homes and elsewhere has given rise to an immediate need for a more efficient, economical and practical solar collector. The objective of this invention is to satisfy this need to the maximum possible extent by providing a solar collector of improved operational efficiency and mechanical construction.

A principal feature of the present invention is the utilization in a solar collector of a pair of collector coils for fluid to be heated in which the flow of fluid in each coil is independently controlled by temperature-responsive valves, one for each coil, the valves remaining closed to block fluid flow in their coils below a certain fluid temperature, and then opening gradually toward a full open flow condition as the fluid temperature in the associated coil increases.

Another feature of the invention is the arrangement of two serpentine collector coils in spaced parallel planes within a common collector housing and in laterally offset parallel relationship to such an extent that the serpentine loops of the two coils overlap laterally by approximately one-half of the width of each loop. This offset relationship enables the two coils of the collector to utilize the sun's ray energy to the maximum possible extent, resulting in increased thermal efficiency for the collector.

The solar collector for use in a fluid heating system in accordance with the invention possesses a number of features of construction which render manufacturing more economical and practical, and these and other features of the invention will be apparent during the course of the following description.

Some examples of the prior art are noted below in order to comply with the duty to disclose required by 37 C.F.R. 1.56:
U.S. Pat. No. 2,202,756
U.S. Pat. No. 3,039,453
U.S. Pat. No. 3,299,881
U.S. Pat. No. 3,985,117.

DETAILED DESCRIPTION

Figure 4:
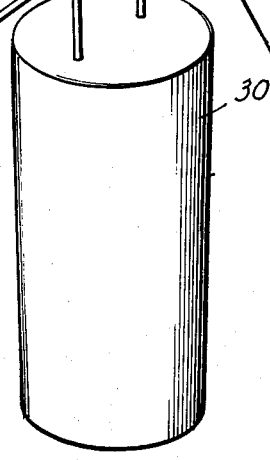
FIG. 4 is an enlarged fragmentary vertical section through one upper corner of the collector housing and top closure means.
Figure 4:
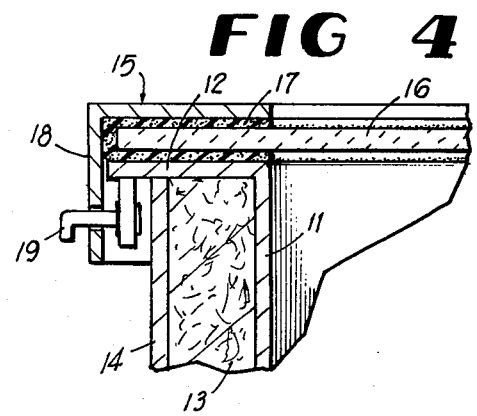

Referring to the drawings in detail wherein like numerals designate like parts, a solar collector 10 forming the principal subject matter of the invention comprises a shallow rectangular housing or pan 11 preferably formed of aluminum and including a top outwardly directed continuous marginal flange 12, as best shown in FIG. 4. The side and bottom walls of the housing 11 are jacketed with thermal insulating material 13, such as urethane, this material being suitably bonded to the exterior surfaces of the housing 11. The insulating material 13 is enclosed within an outer preferably aluminum shell or skin 14, also bonded adhesively to the insulating material and providing a vapor barrier thereon. The elements 11, 12, 13 and 14 are of unit construction in the shallow housing or pan of the collector unit 10. The interior surfaces of the rectangular housing 11 are provided with a dull black finish to promote thermal efficiency.

The open top of the housing 11 of collector 10 has a removable cover 15 consisting of a clear tempered glass panel 16 having a continuous marginal edge U-cross section elastic seal 17, FIG. 4. A right angular rectangular cover frame 18 rests on the marginal seal 17 and is clampingly secured to the marginal flange 12 by a series of conventional thumb locks 19 carried by the frame 15 in spaced relationship around the rectangular collector unit. This arrangement securely seals the interior of the collector housing 11 when the cover 15 is in place and allows ready access to the interior of the housing when maintenance is required. The described construction of the collector housing and its cover means is entirely practical and economical, sturdy and efficient compared to some rather haphazard arrangements which have been utilized heretofore in solar collectors.

Figure 3:
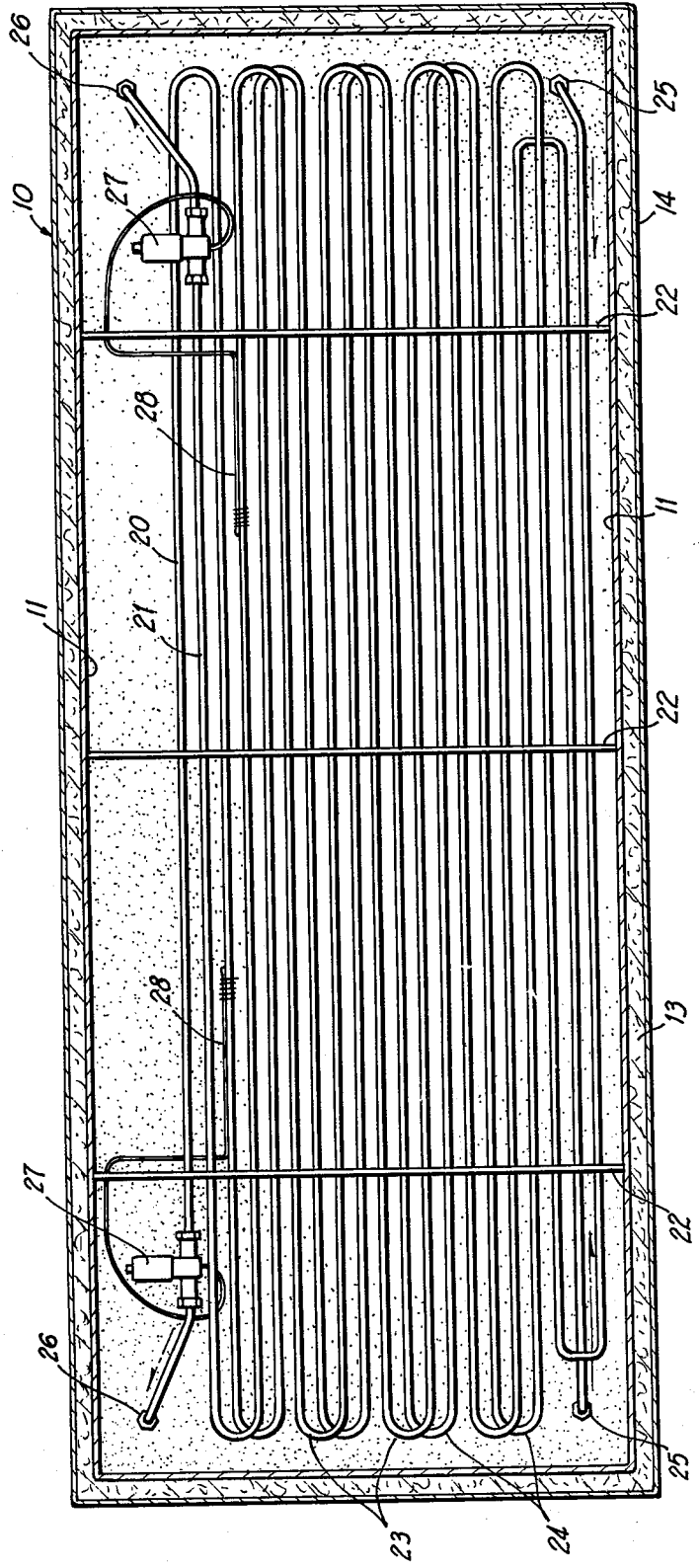
FIG. 3 is a horizontal section taken on line 3—3 of FIG. 2.
Figure 2:
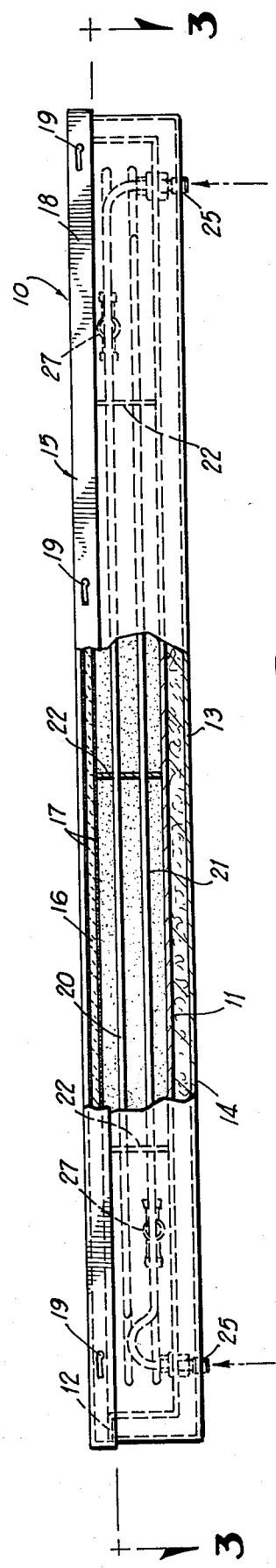
FIG. 2 is a side elevational view, partly in cross section, showing a solar collector unit.

Within the housing 11 is a pair of independent elongated serpentine preferably copper collector coils 20 and 21. As shown in FIGS. 2 and 3, these two coils span the major portions of the length and width of the rectangular housing. The serpentine coils 20 and 21 are spaced apart in the housing in parallel planes above and parallel to the bottom wall of the housing 11. The two coils are firmly supported in fixed relationship within the housing by a suitable number of transverse apertured coil support webs 22 fixed within the housing 11, as shown in FIGS. 2 and 3.

A significant feature of the invention is that the two serpentine coils 20 and 21 are offset laterally in their independent parallel planes to such an extent that their individual loops 23 and 24 overlap laterally by about one-half of the width of each loop, as shown in FIG. 3. This arrangement assures maximum exposure of the two serpentine collector coils to the sun's rays.

While the dimensions of the invention may vary considerably depending upon the requirements of particular installations, the rectangular housing 11 may measure about 98×38×6 inches, with the lower coil 21 spaced about 1½ inches from the bottom wall of the housing 11 and the upper coil 20 about 3½ inches above the housing bottom wall. Within this configuration, each coil 20 and 21 is about 75 feet long. While these dimensions are not critical and may be varied considerably in practice, they do represent a practical embodiment of the invention.

The two offset and laterally overlapping coils 20 and 21 are in opposing fluid flow relationship as shown by the directional arrows in FIG. 3. Inlet fittings 25 for the serpentine coils 20 and 21 are secured within the bottom wall of housing 11 near and inwardly of two corners thereof and outlet fittings 26 for the two coils are similarly secured in the housing bottom wall near the other two corners of the housing. As shown by the arrows in FIG. 2, fluid such as water to be heated flows into the coils 20 and 21 in counterflow relationship through the two fittings 25 and after solar heating in the collector housing flows out of the collector through the fittings 26.

A very important feature of the invention is the provision in each coil 20 and 21 slightly upstream of its outlet fitting 26 of a thermostat or temperature-responsive flow control valve 27 of a conventional type coupled directly into the final loop of each serpentine coil. Each flow control or modulating valve 27 includes a temperature sensing element 28 arranged in thermal contact with a loop of each coil 20 and 21, FIG. 3.

The temperature-responsive valves 27 thus provide independent control of fluid in the two coils 20 and 21. For example, the valves can be calibrated to be closed at fluid temperatures of 115° F. or below and therefore at such temperatures substantially no fluid will be delivered through the outlet fittings 26. The valves 27 are provided with small openings (not shown) which continually allow some fluid to pass through the coils 20 and 21 in order to prevent a pressure build-up in the coils 20 and 21 and to help prevent freezing of the fluid during the winter months. The valves are calibrated so that they are fully open at fluid temperatures of 180° F., at which temperatures three to four gallons per minute of heated fluid will be circulated through each coil and out of the collector through its fitting 26. The two coils are thus independently controlled by their valves 27 in the collector. The temperature ranges, above specified, are examples only and may by varied in practice.

Figure 1:
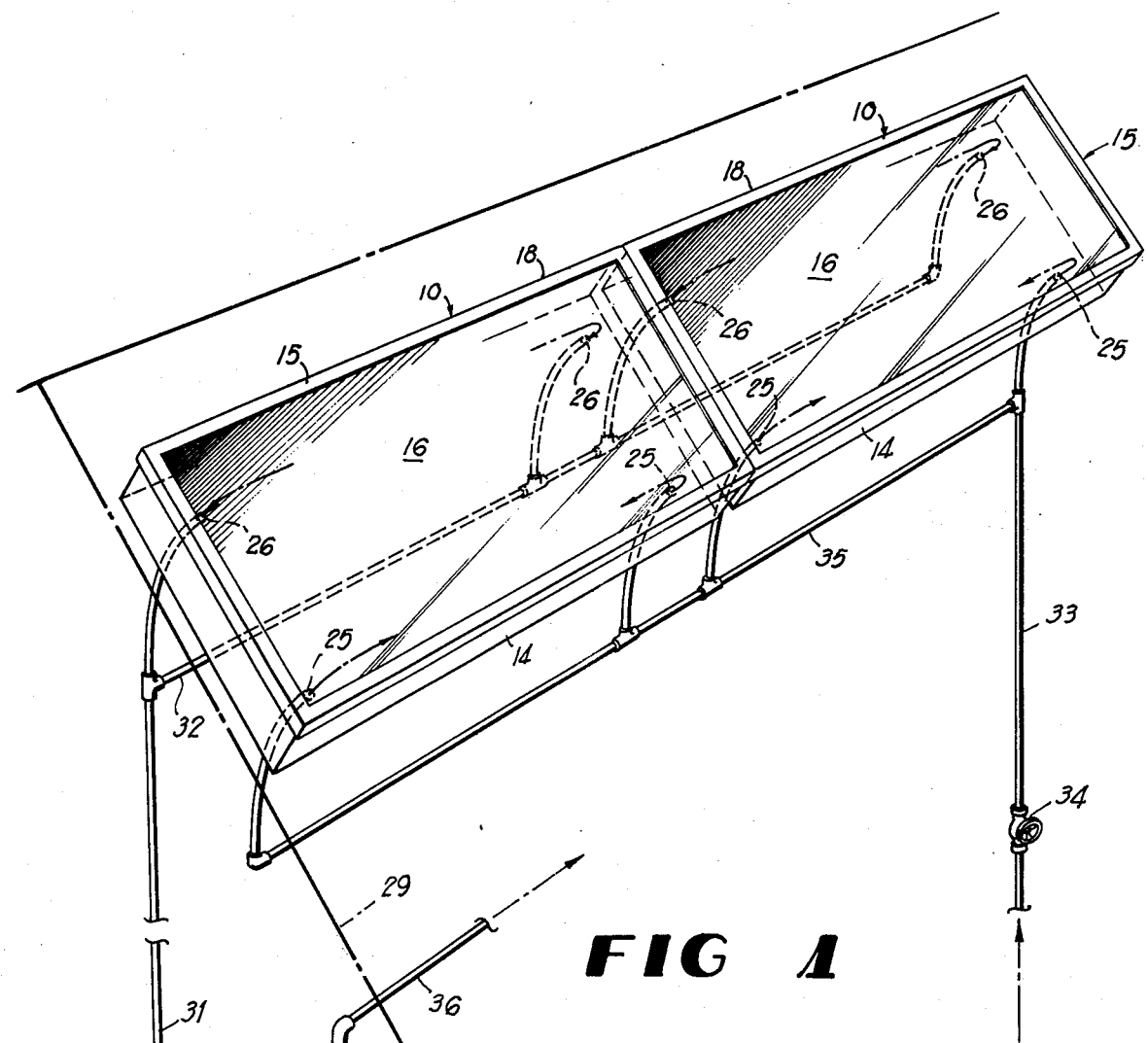
FIG. 1 is a partly schematic perspective view of a fluid heating system utilizing solar collector units embodying the present invention.

The solar collector 10, above described, may be utilized in various systems including upfeed or downfeed hot water heating systems. FIG. 1 illustrates an application of the solar collector to a home hot water heating system. In FIG. 1, a pair of the collector units 10 are shown mounted on a roof 29 with their glass panels 16 facing the sun. The home water heating tank is indicated at 30 connected by a supply line 31 with the outlets 26 of the two collectors 10. A branch line 32 serves to connect the outlets of the two collectors 10 with the tank supply line 31, as illustrated. A cold water supply line 33 having a shut off valve 34 and having a branch line 35 delivers water to the inlets 25 of the collectors 10. In this manner, any number of collector units 10 can be connected in parallel by merely increasing the lengths of the branch lines 32 and 35.

As previously described, the controlled flow of water through the two serpentine coils 20 and 21 of each collector unit produces solar heating of the water and the resulting hot water is delivered to the holding tank 30 from the supply line 31 and can then be delivered to house fixtures through a tank outlet line 36. The automatic thermostatically controlled valves 27 respond to fluid temperature and retard the circulation of water in the coils 20 and 21 until the water is heated in the coils to the required degree. As explained previously, flow in the two coils 20 and 21 is independently controlled by the valves 27 to assure maximum efficiency in the collector and in the system employing the collector.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A solar collector comprising a collector housing, a pair of serpentine collector coils mounted within the housing in spaced planes and in opposing fluid flow relationship in said planes, said coils being offset laterally each with respect to the other to such extent that corresponding individual loops of the two coils overlap laterally, inlet and outlet fluid fittings for the ends of the coils in the collector housing, and a fluid temperature responsive flow regulating valve connected in each coil within the housing and having a temperature sensing element in contact with a loop of each coil so that said valves control independently the circulation of fluid through the two serpentine coils between upper and lower predetermined temperature limits for which the valves are calibrated to open and close said valves connected in said serpentine coils near and slightly upstream from said outlet fluid fittings, a fluid storage tank, and fluid conduits connecting said tank with the outlet fluid fitting of each of said collector coils, said collector housing comprising a shallow rectangular open top housing having insulated side and bottom walls and a continuous top outwardly extending marginal flange, a releasable closure for the open top of the housing comprising a glass panel having a marginal edge U-cross section elastic seal, an angle frame having a top flange resting on said seal and a depending side flange projecting below the marginal flange of said housing, and plural spaced manually operated lock and release devices on said side flange and engaging under the housing marginal flange to urge the top flange of the angle frame toward the housing marginal flange with said elastic seal clamped therebetween.

* * * * *